United States Patent
Brandoli et al.

(10) Patent No.: US 6,759,444 B2
(45) Date of Patent: Jul. 6, 2004

(54) INTEGRAL SKIN FOAMS EMPLOYING PENTAFLUOROBUTANE BLOWING AGENTS

(75) Inventors: Andrea Brandoli, Modena (IT); Alberto Micagni, Castelfranco Emilia (IT); Giuliano Guidetti, Carpi (IT); Stefano Mussini, Casalgrande (IT)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 10/239,592

(22) PCT Filed: Mar. 28, 2001

(86) PCT No.: PCT/US01/10134
§ 371 (c)(1),
(2), (4) Date: Sep. 23, 2002

(87) PCT Pub. No.: WO01/72880
PCT Pub. Date: Oct. 4, 2001

(65) Prior Publication Data
US 2003/0055118 A1 Mar. 20, 2003

(51) Int. Cl.⁷ .................................. C08J 9/34
(52) U.S. Cl. ..................... 521/51; 521/131; 521/170
(58) Field of Search ................. 521/51, 131, 170

(56) References Cited

U.S. PATENT DOCUMENTS

| | | | | |
|---|---|---|---|---|
| 5,100,922 A | * | 3/1992 | Wada et al. | 521/51 |
| 5,114,980 A | * | 5/1992 | Lii et al. | 521/51 |
| 5,348,681 A | | 9/1994 | Desbiendras et al. | |
| 5,506,275 A | | 4/1996 | Valoppi | |
| 5,906,999 A | | 5/1999 | Valoppi et al. | |
| 6,010,649 A | | 1/2000 | Valoppi et al. | |
| 6,080,799 A | | 6/2000 | Kruecke et al. | |
| 6,380,275 B1 | * | 4/2002 | Kruecke et al. | 521/131 |
| 6,590,003 B2 | * | 7/2003 | Eisen et al. | 521/51 |

FOREIGN PATENT DOCUMENTS

| | | |
|---|---|---|
| CA | 2 394 169 | 6/2001 |
| DE | 198 36 662 A1 | 2/2000 |

\* cited by examiner

Primary Examiner—John M. Cooney, Jr.

(57) ABSTRACT

It has been found that non-chlorinated pentafluorobutane blowing agents may be used alone or in combination with water in flexible integral skin foams. For example, foams prepared using 1,1,1,3,3-pentafluorobutane (HFC 365mfc) alone or in combination with water or other non-cholorinated hydrocarbons such as heptafluoropropane exhibit improved physical characteristics, such as resistance to abrasion and cracking, on flex comparable to conventional chlorinated fluorocarbon blown foam.

21 Claims, No Drawings

INTEGRAL SKIN FOAMS EMPLOYING PENTAFLUOROBUTANE BLOWING AGENTS

The present invention relates to integral skin foams and a process for preparing such foams utilizing non-chlorinated fluorocarbons as the sole blowing agent or with water as a co-blowing agent.

BACKGROUND OF THE INVENTION

Integral skin foams are well known to those skilled in the art of polyurethane foams. Such foams have a cellular interior and a higher density microcellular or non-cellular skin. In general, to prepare such foams an organic isocyanate is reacted with a substance having at least one isocyanate reactive group in the presence of a catalyst, blowing agent, and a variety of optional additives. The reaction is carried out in a mold where a higher density skin forms at the interface of the reaction mixture and the relatively cool inner surface of the foam.

Generally the blowing agent used in integral skin polyurethane foams have been chlorofluorocarbons (CFCs) or combinations of CFCs and other blowing agents. However, in view of regulations for a reduction and eventual elimination of the use of CFCs, alternatives are considered necessary.

U.S. Pat. No. 5,506,275 describes the use of 1,1,1,2-tetrafluoroethane (HFC 134a) as an alternative to conventional chlorinated fluorocarbon blowing agents in integral skin foam formulations. While this blowing agent offers an alternative to halogenated hydrocarbon blowing agents, it boils at about −27° C. and may require special gas delivery systems to introduce and maintaining the blowing agent in solution. In addition, HFC 134a has a limited solubility in the polyol component.

U.S. Pat. Nos. 5,906,999 and 6,010,649 disclose the use of pentafluoropropane blowing agents, particularly 1,1,1,3,3-pentafluoropropane for producing integral skin foams. The pentafluoropropane blowing agents are reported to give acceptable appearance and exhibit enhanced resistance to abrasion and cracking.

While tetrafluoroethane and pentafluoropropane blowing agent present alternatives to the conventional CFCs, there remains a need for non-chlorinated hydrocarbon blowing agents. It has been found that integral skin foams utilizing pentafluorobutane blowing agents can meet the stringent requirements inherent to integral skin foam applications to give an acceptable appearance and exhibit acceptable resistance to abrasion and cracking upon flex. Furthermore, the pentafluorobutane blowing agents utilized in the present invention are generally soluble in the polyol component thus eliminating or greatly reducing the need for specialized gas delivery systems.

SUMMARY OF THE INVENTION

The present invention is to provide an integral skin polyurethane foam comprising the reaction product of
a) a polyisocyanate component; and
b) a polyol composition; in the presence of
c) a blowing agent including non-chlorinated pentafluorobutane and optionally water;
d) a catalyst; and
optionally one or more compounds selected from the group consisting essentially of chain extenders, surfactants, alcohols, fillers, pigments, antioxidants, stabilizers and mixtures thereof.

In another embodiment the present invention is a process of making a molded integral skin polyurethane foam article comprising the steps of:
a) providing an organic polyisocyanate;
b) providing a resin comprising;
  i) a polyol composition;
  ii) a blowing agent including non-chlorinated pentafluorobutane and optionally water;
  iii) a catalyst; and
  iv) optionally one or more compounds selected from the group consisting essentially of chain extenders, surfactants, alcohols, fillers, pigments, antioxidants, stabilizers and mixtures thereof.
c) introducing components a) and b) into a mold and reacting the components for a period of time sufficient to produce a molded integral skin polyurethane article.

In another embodiment, the present invention is a cellular polyurethane foam characterized in that the foam has an integral skin and the gas content of the cells comprises non-chlorinated pentafluorobutane. In yet another embodiment of the present invention, the blowing used in the above process, and formation of an integral skin foam is a combination of tetrafluoroethane and pentafluorobutane and optionally water.

In a further embodiment, the blowing agent used in the present invention is a combination of a heptafluoropropane and pentafluorobutane and optionally water.

In yet another embodiment, the blowing agent is a combination of pentafluorobutane, tetrafluoroethane and heptafluoropropane, optionally in the presence of water.

DETAILED DESCRIPTION

The isocyanates which may be used in the present invention are aromatic polyisocyanates.

Examples of suitable aromatic isocyantes include the 4,4'-, 2,4' and 2,2'-isomers of diphenylmethane diisocyante (MDI), blends thereof and polymeric and monomeric MDI blends toluene-2,4- and 2,6-diisocyanates (TDI), m- and p-phenylenediisocyanate, chlorophenylene-2,4-diisocyanate, diphenylene-4,4'-diisocyanate, 4,4'-diisocyanate-3,3'-dimehtyldiphenyl, 3-methyldiphenylmethane-4,4'-diisocyanate and diphenyletherdiisocyanate and 2,4,6-triisocyanatotoluene and 2,4,4'-triisocyanatodiphenylether.

Mixtures of isocyanates may be used, such as the commercially available mixtures of 2,4- and 2,6-isomers of toluene diisocyantes. A crude polyisocyanate may also be used in the practice of this invention, such as crude toluene diisocyanate obtained by the phosgenation of a mixture of toluene diamine or the crude diphenylmethane diisocyanate obtained by the phosgenation of crude methylene diphenylamine. TDI/MDI blends may also be used. Prepolymers based on the polyisocyanates can also be used. Isocyanate-terminated prepolymers are prepared by reacting an excess of polyisocyanate with polyols, including aminated polyols or imines/enamines thereof, or polyamines.

The polyisocyanates are prepared by conventional methods known in the art such as the phosgenation of the corresponding organic amine.

Especially useful, due to their availability and properties, are 2,4'-diphenyl diisocyanate, 4,4'-diphenylmethane diisocyanate, polymethylene polyisocyanate and mixtures thereof. Mixtures of polymeric diphenylmethane diisocyanate (polymeric MDI) and carbodiimide or urethane modified MDI are preferred. The polyisocyanate is generally added in an amount to provide an isocyanate index between 80 and 125, preferably between 100 to 110.

The polyol component includes those materials having two or more groups containing an active hydrogen atom capable of undergoing reaction with an isocyanate. Preferred among such compounds are materials having at least two hydroxyl, primary or secondary amine, carboxylic acid, or thiol groups per molecule Compounds having at least two hydroxyl groups per molecule are especially preferred due to their desirable reactivity with polyisocyanates.

The hydroxyl number and molecular weight of the polyol can vary according to the desired property of the cellular foam. In general the hydroxyl number will range from about 20 to 800. In applications for producing flexible articles, typically polyols include those having an average hydroxyl number ranging from 20 to 100 mg KOH/g, preferably from 20 to 70 mg KOH/g. Such polyols also advantageously have a functionality between 1.5 and 4, preferably between 2 and 3. Generally the number average molecular weight is 2,000 to 10,000, preferably from 3000 to 6000 and more preferred from 3500 to 5100. For applications for producing rigid articles, typically polyols include those having an average molecular weight of 60 to 10,000, preferably 600 to 7,000 and more preferred from 600 to 3,000. Such polyols also advantageously have a functionality between 2 and 6, preferably between 2 and 4.

Representative polyols include polyether polyols, polyester polyols, polyhydroxy-terminated acetal resins, hydroxyl-terminated amines and polyamines. Examples of these and other suitable isocyanate-reactive materials are described more fully in U.S. Pat. No. 4,394,491.

Preferred are polyether polyols prepared by adding an alkylene oxide, such as ethylene oxide, propylene oxide, butylene oxide or a combination thereof, to an initiator having from 2 to 8, preferably 3 to 6 active hydrogen atoms. Examples of suitable initiator molecules for polyether or polyester polyols include water, organic dicarboxylic acids, such as succinic acid, adipic acid, phthalic acid and terephthalic acid and polyhydric, in particular dihydric to octahydric alcohols or dialkylene glycols, for example, ethanediol, 1,2- and 1,3-propanediol, diethylene glycol, dipropylene glycol, 1,4-butanediol, 1,6-hexanediol, glycerol, trimethylolpropane, pentaerythritol, sorbitol and sucrose or blends thereof. Other initiators include linear and cyclic compounds containing a tertiary amine such as ethanoldiamine, triethanoldiamine, and various isomers of toluene diamine. Catalysts for polymerization of alkylene oxides with the initiator can be either anionic or cationic. Representative examples of such catalysts are KOH, CSOH, boron trifluoride or a double cyanide complex (DMC) catalyst such as zinc hexacyanocoboltate.

The polyol may have incorporated therein copolymer polyols of vinyl monomers in a continuos polyol phase, particularly dispersions of styrene/acrylonitrile (SAN) copolymers. Polyisocyanate polyaddition (PIPA) polyols (dispersions of polyurea-polyurethane particles in a polyol) and the polyurea dispersions in polyols (PHD polyols). Such polyols are described in Polyurethane Handbook, by G., Oertel, Hanser publishers, and U.S. Pat. Nos. 3,932,092; 4,014,846; 4,093,573 and 4,122,056, and EP Publications 0 418 039 B1 and EP 0 687 279 B1, the disclosures of which are incorporated herein by reference.

The total amount of active hydroxy-functional polyol composition used in the present invention includes from about 55 to about 95 parts by weight based upon 100 parts by weight of the resin. More preferably the total amount of polyol is from about 60 to about 95 parts by weight of the resin.

The blowing agent of the present invention includes a non-chlorinated pentafluorobutane compound and particularly 1,1,1,3,3-pentafluorobutane, also known as HFC-365mfc. The pentafluorobutane blowing agent is used either alone or in conjunction with water or other non-chlorinated blowing agents in amounts sufficient to provide the desired foam density. In a preferred embodiment, the pentafluorobutane is used in conjunction with tetrafluoroethane, particularly 1,1,1,2- (HFC-134a) and/or 1,1,1,2,3,3,3-heptafluoropropane (HFC 227), and/or pentafluoropropane (HFC 245) in conjunction with sufficient water to provide the desired foam density. Generally HFC-134a or HFC 227 is added to form a blend with the pentafluorobutane to give an unflammable blend.

Depending on the amount of water and/or non-chlorinated solvents (tetrafluoroethane and/or heptafluoropropane) employed as co-blowing agent and the pack factor of the molded component, the amount of non-chlorinated pentafluorobutane blowing agent employed will generally range from about 0.4 to 14 parts by weight, and more preferably 0.9 to 12 parts by weight based on 100 parts of the resin for foams having molded densities of from 100 kg/m3 to about 650 kg/m3. For example, for shoe soles, the amount of pentafluorobutane used as the sole blowing agent will be from about 1.3 to about 6 parts by weight for foams having a molded density of 300 kg/m$^3$ to about 600 kg/m$^3$ at a molded pack factor of 1.5–3.0. When used as a sole blowing agent for a steering wheel, the range will generally be from 2 to 10 parts by weight for foams having molded densities of from 400 kg/m$^3$ to about 600 kg/m$^3$ with a pack factor of 2.0–6.0. As water and/or tetrafluoroethane and/or heptafluoropropane is added as a co-blowing agent, the amount of non-chlorinated pentafluorobutane blowing agent is proportionately reduced. Generally the thickness of the skin layer is less than 2 mm.

Generally, the pentafluorobutane will comprise from about 1 to about 99 percent by weight of the blowing agent. When used in combination with tetrafluorethane or heptafluoropropane, the pentafluorobutane is preferably present in an amount of from 10 to 97 percent by weight of the total blowing agent. More preferably, the pentafluorobutane is present from 25 to 95 percent by weight of the total blowing agent When water is present, it will generally be in an amount from 1 to 15 percent by weight and preferably from 1 to 10 percent by weight of the total blowing agent. As the amount of tetrafluoroethane or heptafluoropropane blowing agent is increased, a reduction in the hardness and the skin thickness is observed with respect to the use of pentafluorobutane as the blowing agent.

For ease of processing, the blowing agent is generally formulated with the polyol component. Due to the low boiling point of the pentafluorobutane, to avoid variance in the amount of blowing agent due to any loss of pentafluorobutane during storage, the blowing agent can be added at the mixing head as a separate stream.

The mechanical parameters of the current process are flexible and depend on the final application of the integral skin polyurethane foam. The reaction system is versatile enough that it may be made in a variety of densities and hardness. The system may be introduced into a mold in a variety of ways known to those skilled in the art. It may be shot into a preheated closed mold via high pressure injection technique. In this manner, it processes well enough to fill complex molds at low mold densities (from 300 kg/m$^3$ to 400 kg/m$^3$). It may also be run using a conventional open mold technique wherein the reaction mixture or system is poured or injected relatively at low pressure or atmospheric pressure into a preheated open mold. In the instant process, the system may be run at mold temperatures from about room temperature to about 50° C. with room temperature being preferred.

In addition to the foregoing critical components, it is often desirable to employ certain other ingredients in preparing polyurethane polymers. Among these additional ingredients are surfactants, plasticizers such as gamma butylactone, preservatives, alcohols, flame retardants, fungistatic and/or bacteriostatic, colorants, antioxidants, reinforcing agents, stabilizers and fillers.

While surface active agents or surfactants are generally not needed to solubilize the blowing agent of the present invention, they may be employed to stabilize the foaming reaction mixture until it cures or to regulate the cell size and structure of the resulting foam. Such surfactants advantageously comprise a liquid or solid organosilicone surfactant. Other surfactants include polyethylene glycol ethers of long-chain alcohols, tertiary amine or alkanolamine salts of long-chain alkyl acid sulfate esters, alkyl sulfonic esters and alkyl arylsulfonic acids. Such surfactants are employed in amounts sufficient to stabilize the foaming reaction mixture against collapse and the formation of large, uneven cells. Typically, 0.2 to 3 parts of the surfactant per 100 parts by weight total polyol (b) are sufficient for this purpose. Other examples of surface active components include paraffinoils, castor oil esters, phthalic acid esters, ricindolic acid esters and Turkey red oil.

One or more catalysts for the reaction of the polyol (and water, if present) with the polyisocyanate can be used. Any suitable urethane catalyst may be used, including tertiary amine compounds, amines with isocyanate reactive groups and organometallic compounds. Preferably the reaction is carried out in the absence of an amine or an organometallic catalyst or a reduced amount as described above. Exemplary tertiary amine compounds include triethylenediamine, N-methylmorpholine, N,N-dimethylcyclohexylamine, pentamethyldiethylenetriamine, tetramethylethylenediamine, bis (dimethylaminoethyl)ether, 1-methyl-4-dimethylaminoethyl-piperazine, 3-methoxy-N-dimethylpropylamine, N-ethylmorpholine, dimethylethanolamine, N-cocomorpholine, N,N-dimethyl-N', N'-dimethyl isopropylpropylenediamine, N,N-diethyl-3-diethylaminopropylamine and dimethylbenzylamine. Exemplary organometallic catalysts include organomercury, organolead, organoferric and organotin catalysts, with organotin catalysts being preferred among these. Suitable tin catalysts include stannous chloride, tin salts of carboxylic acids such as dibutyltin di-laurate, as well as other organometallic compounds such as are disclosed in U.S. Pat. No. 2,846,408. A catalyst for the trimerization of polyisocyanates, resulting in a polyisocyanurate, such as an alkali metal alkoxide may also optionally be employed herein. The amount of amine catalysts can vary from 0.02 to 5 percent in the formulation or organometallic catalysts from 0.001 to 1 percent in the formulation can be used.

A crosslinking agent or a chain extender may be added, if necessary. The crosslinking agent or the chain extender includes low-molecular polyhydric alcohols such as ethylene glycol, diethylene glycol, 1,4-butanediol, and glycerin; low-molecular amine polyol such as diethanolamine and triethanolamine; polyamines such as ethylene diamine, xlylenediamine, and methylene-bis(o-chloroaniline). The use of such crosslinking agents or chain extenders is known in the art as disclosed in U.S. Pat. Nos. 4,863,979 and 4,963,399 and EP 549,120, the disclosures of which are incorporated herein by reference.

A flame retardant can be added to the formulations, particularly in formulations for producing structural rigid foams. Any known liquid or solid flame retardant can be used. Generally such flame retardant agents are halogen-substituted phosphates and inorganic flame proofing agents. Common halogen-substituted phosphates are tricresyl phosphate, tris(1,3-dichloropropyl phosphate, tris(2,3-dibromopropyl) phosphate and tetrakis (2-chloroethyl) ethylene diphosphate. Inorganic flame retardants include red phosphorous, aluminum oxide hydrate, antimony trioxide, ammonium sulfate, expandable graphite, urea or melamine cyanurate or mixtures of at least two flame retardants. In general, when present, flame retardants are added at a level of from 5 to 50 parts by weight, preferable from 5 to 25 parts by weight of the flame retardant per 100 parts per weight of the total polyol present.

The applications for integral skin foams produced by the present invention are those known in the industry. For example they find use in applications such as furniture, shoe soles, automobile seats, sun visors, steering wheels, armrests, door panels, noise insulation parts and dashboards.

Processing for producing such polyurethane products are well known in the art. In general components of the polyurethane-forming reaction mixture may be mixed together in any convenient manner, for example by using any of the mixing equipment described in the prior art for the purpose such as described in Polyurethane Handbook, by G. Oertel, Hanser publisher.

The following examples are given to illustrate the invention and should not be interpreted as limiting in anyway. Unless stated otherwise, all parts and percentages are given by weight.

A description of the raw materials used in the examples is as follows.

POLYOL 1 is a glycerol initiated polyoxypropylene polyoxyethylene polyol having an average hydroxyl number of 35 available from The Dow Chemical Company.

POLYOL 2 is a glycerol initiated polyoxypropylene polyoxyethylene polyol having an average hydroxyl number of 28 available from The Dow Chemical Company.

POLYOL 3 is a polyoxyethylene/polyoxypropylene polyether diol having an average equivalent weight of about 2000 available from The Dow Chemical Company.

POLYOL 4 is a 40% SAN based copolymer polyol with an average hydroxyl number of 20 available from The Dow Chemical Company.

POLYOL 5 is a glycerine-sucrose initiated propoxilated polyol having an average hydroxyl number of 360 available from The Dow Chemical Company.

POLYOL 6 is a glycerine initiated propoxylated polyol having an average hydroxyl number of 380 available from The Dow Chemical Company.

POLYOL 7 is a glycerine initiated propoxylated polyol having an average hydroxyl number of 670 available from The Dow Chemical Company.

POLYOL 8 is a glycerine initiated propoxylated polyol having an average hydroxyl number of 160 available from The Dow Chemical Company.

POLYOL 9 is a glycerine initiated random ethylene oxide/ propylene oxide polyol having an average hydroxyl number of 35 available from The Dow Chemical Company.

Polyol 10 is an oxyethylene-oxypropylene adduct of a phenol/formaldehyde resin, hydroxyl number 196.

Catalyst 1 is a 33% Triethylene diamine in dipropyleneglycol.

Catalyst 2 is a N, N-dimethyl cyclohexylamine.

Catalyst 3 is a 70% bis (dimethylaminoethyl) ether and 30% dipropylene glycol.

Catalyst 4 is a pentamethyl, dipropylene triamine.

Catalyst 5 is a 33% Triethylene diamine in 1–4 Butanediol.

Catalyst 6 is dibutyltin dilaurate.

Tegostab B 1048 is a foam stabilizer based on a polyether polysiloxane copolymer.

Black Paste is a carbon black dispersion in polyether polyol (20:80).

HFA 134a is 1,1,1,2-tetrafluoroethane available from Solvay Fluor and Derivate Gmbh.

HFA 365mfc is 1,1,1,3,3-pentafluorobutane available from Solvay Fluor and Derivate Gmbh.

HFA 277 is 1,1,1,2,3,3,3-heptafluoropropane.

POLYISOCYANATE 1 is a urethane-modified polyisocyanate having an isocyanate content of 28 weight percent and is obtained by reaction of tripropylene glycol with a mixture of methylene diphenylisocyanate and polymethylene polyphenyl polyisocyanate available from The Dow Chemical Company.

POLYISOCYANATE 2 is a prepolymer obtained by reaction of 4,4'- methylene diphenylisocyanate with tripropylene glycol and has an isocyanate contents of 23.1 weight percent available from The Dow Chemical Company.

POLYISOCYANATE 3 is a diphenylmethane diisocyanate (MDI) 40–50% and polymethylenepolyphenylene isocyanate 50–60% and has an isocyanate content of 31 weight percent available from The Dow Chemical Company.

Tegostab is a Trademark of Goldsmith.

EXAMPLES 1–3

The molded polyurethane is prepared according to the formulation as given in Table 1 using a combination of pentafluorobutane and tetrafluoroethane as blowing agent. The formulations are mixed with a high pressure dispenser equipped with a Cannon A40 14 mm. FPL mixing head, for the examples 1 and 2, and a low pressure dispenser "Gusbi" machine for the example 3.

The reacting component temperature and the mold temperature are as reported in Table 1. The quantity of reactions dispensed is sufficient to provide for a molded product having an overall density as indicated in Table 1. The polyurethane products for examples 1 and 3 are removed from the mold after 3 minutes. The polyurethane product of the example 2 is removed from the mold after 5 minutes. The hardness, according to the ISO 868, is checked after 72 hours from the demolding.

Example 1 is for the formation of a semi-rigid integral skin foam. Example 2 is for the production of a structural rigid integral skin foam. Example 3 is a formulation for the production of an elastomer integral skin foam for shoe soles. Examples A, B and C are the respective comparatives.

The results show that the presence of HFC 356mfc improves both the hardness and the skin thickness.

TABLE 1

| INGREDIENTS | EXAMPLE A* | EXAMPLE 1 | EXAMPLE B* | EXAMPLE 2 | EXAMPLE C* | EXAMPLE 3 |
|---|---|---|---|---|---|---|
| Polyol 1 | 69.24 | 64.66 | | | | |
| Polyol 2 | | | | | 17.5 | 17.3 |
| Polyol 3 | | | | | 70.2 | 69.1 |
| Polyol 4 | 14.60 | 13.70 | | | | |
| Polyol 5 | | | 67.25 | 71.53 | | |
| Polyol 6 | | | 18.68 | 11 | | |
| Polyol 7 | | | | 9.17 | | |
| Polyol 8 | | | 7.47 | | | |
| 1,4-Butanediol | | | | | 8.7 | 8.7 |
| Ethylene Glycol | 7.78 | 7.30 | | | | |
| Catalyst 1 | | | 1.49 | 0.82 | | |
| Catalyst 2 | | | 1.47 | 0.92 | | |
| Catalyst 3 | | | | 0.09 | | |
| Catalyst 4 | 0.76 | 0.72 | | | | |
| Catalyst 5 | | | | | 1.2 | 1.2 |
| Catalyst 6 | | | | | 0.02 | 0.02 |
| Tegostab B 1048 | | | 1.4 | 1.4 | | |
| Black Paste | 5 | 5 | | | | |
| HFA 134a | 2.5 | 0.6 | 2.8 | 0.32 | 2.2 | 0.3 |
| HFA 365 mfc | | 7.9 | | 4.27 | | 3.2 |
| Water | 0.12 | 0.12 | 0.44 | 0.48 | 0.18 | 0.18 |
| Total formulated polyol p. b. w. | 100 | 100 | 100 | 100 | 100 | 100 |
| Polyisocyanate 1 p. b. w. | 46 | 44 | | | | |
| Polyisocyanate 2 p. b. w. | | | | | 50 | 50 |
| Polyisocyanate 3 p. b. w. | | | 100 | 100 | | |
| Cream time sec. | 9 | 12 | 12 | 12 | 7 | 9 |
| Gel time sec. | 36 | 45 | 59 | 60 | 16 | 19 |
| Rise Time sec. | 50 | 55 | 95 | 97 | 28 | 31 |
| Free rise den. Gr/lt | 150 | 130 | 122 | 128 | 230 | 220 |
| Mould dens. Gr/lt | 390 | 390 | 275 | 274 | 550 | 550 |
| Mold Temp. °C. | 45 | 45 | 45 | 45 | 50 | 50 |
| Hardness: | | | | | | |
| Shore A | Shore A 69 | Shore A 81 | | | Shore A 55 | Shore A 60 |
| Shore D | | | Shore D 41 | Shore D 50 | | |
| Skin thickness mm | 0.3 | 1.3 | N. A. | N. A. | 0.4 | 1.3 |

N. A. = Not Available.
*Not examples of the present invention

EXAMPLES 3, 5, and 6

Examples 3, 5 and 6 are respectively to the production of a rigid integral skin foam, a structural rigid integral skin foam and an elastomer integral skin foam for shoe soles using a combination of a pentafluorobutane and heptafluoropropane as blowing agent. Examples D, E and F are the respective comparatives. The general procedure for mixing the formulations is as given in Examples 1–3. The formulations and reaction conditions are as given in Table 2.

| INGREDIENTS | EXAMPLE D* | EXAMPLE 4 | EXAMPLE E* | EXAMPLE 4 | EXAMPLE F* | EXAMPLE 5 |
|---|---|---|---|---|---|---|
| Polyol 1 | 67.79 | 63.30 | | | | |
| Polyol 9 | 1.45 | 1.26 | | 2.75 | | |
| Polyol 2 | | | | | 17.5 | 17.3 |
| Polyol 3 | | | | | 70.2 | 69.1 |
| Polyol 4 | 14.60 | 13.70 | | | | |
| Polyol 5 | | | 67.25 | 59.61 | | |
| Polyol 6 | | | 18.68 | 11 | | |
| Polyol 7 | | | | 9.17 | | |
| Polyol 8 | | | 7.47 | | | |
| Polyol 10 | | | | 9.17 | | |
| 1,4-Butanediol | | | | | 8.7 | 8.7 |
| Ethylene Glycol | 7.78 | 7.30 | | | | |
| Catalyst 1 | | | 1.49 | 0.82 | | |
| Catalyst 2 | | | 1.47 | 0.92 | | |
| Catalyst 3 | | | | 0.09 | | |
| Catalyst 4 | 0.76 | 0.72 | | | | |
| Catalyst 5 | | | | | 1.2 | 1.2 |
| Catalyst 6 | | | | | 0.02 | 0.02 |
| Tegostab 5 1048 | | | 1.4 | 1.4 | | |
| Black Paste | 5 | 5 | | | | |
| HFA 134a | 2.5 | | 2.8 | | 2.2 | |
| HFA 365 mfc | | 7.9 | | 4.27 | | 3.2 |
| HFA 227 ea | | 0.6 | | 0.32 | | 0.3 |
| Water | 0.12 | 0.12 | 0.44 | 0.48 | 0.18 | 0.18 |
| Total formulated polyol p. b. w. | 100 | 100 | 100 | 100 | 100 | 100 |
| Polyisocyanate 1 p. b. w. | 46 | 44 | | | | |
| Polyisocyanate 2 p. b. w. | | | | | 50 | 50 |
| Polyisocyanate 3 p. b. w. | | | 100 | 100 | | |
| Cream time sec. | 9 | 12 | 12 | 12 | 7 | 9 |
| Gel time sec. | 36 | 45 | 59 | 60 | 16 | 19 |
| Rise Time sec. | 50 | 55 | 95 | 97 | 28 | 31 |
| Free rise den. Gr/lt | 150 | 130 | 122 | 128 | 230 | 220 |
| Mould dens. Gr/lt | 390 | 390 | 275 | 274 | 550 | 550 |
| Mold Temp. °C. | 45 | 45 | 45 | 45 | 50 | 50 |
| Hardness: | | | | | | |
| Shore A | Shore A 69 | Shore A 81 | | | Shore A 55 | Shore A 60 |
| Shore D | | | Shore D 41 | Shore D 50 | | |
| Skin thickness mm | 0.3 | 1.3 | N. A. | N. A. | 0.4 | 1.3 |

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

What is claimed is:

1. A molded cellular polyurethane foam characterized in that the foam has an integral skin and the gas content of the cells comprises non-chlorinated pentafluorobutane.

2. The foam of claim 1 wherein the skin has a thickness of less than 2 mm.

3. The foam of claim 1 wherein the cell gas comprises 1,1,1,3,3-pentafluorobutane.

4. The foam of claim 3 wherein the cell gas comprises from 50 to 99 percent by weight of 1,1,1,3,3-pentafluorobutane and from 1 to 50 weight percent of at least one fluorohydrocarbon selected from 1,1,1,2-tetrafluoropentane, 1,1,1,3,3-pentafluoropropane, 1,1,1,3,3,3-hexafluoropropane and 1,1,1,2,3,3,3-heptafluoropropane.

5. The foam of claim 4 wherein the cell gas comprises 1,1,1,3,3-pentafluorobutane and 1,1,1,2-tetrafluoroethane.

6. The foam of claim 4 wherein the cell gas comprises 1,1,1,3,3-pentaflurobutane and 1,1,1,2,3,3,3-heptafluoropropane.

7. A process of making a low density, molded integral skin polyurethane foam article comprising the steps of:
   a) providing an organic polyisocyanate;
   b) providing a resin comprising;
      i) a polyol composition;
      ii) a blowing agent including non-chlorinated pentafluorobutane and optionally water;
      iii) a catalyst; and iv) optionally one or more compounds selected from the group consisting essentially of chain extenders, surfactants, alcohols, fillers, pigments, antioxidants, stabilizers and mixtures thereof;

c) introducing components a) and b) into a mold and reacting the components for a period of time sufficient to produce a molded integral skin polyurethane article.

8. The process of claim 7 wherein the non-chlorinated pentafluorobutane is present in an amount of from about 0.5 to about 15 parts by weight based on 100 parts by weight of components (i)–(iv).

9. The process of claim 7 wherein the non-chlorinated pentafluorobutane blowing agent is 1,1,1,3,3-pentafluorobutane.

10. The process of claim 7 wherein the blowing agent comprises from 50 to 99 percent by weight of 1,1,1,3,3-pentafluorobutane and from 1 to 50 weight percent of at least one fluorohydrocarbon selected from 1,1,1,2-tetrafluoropentane, 1,1,1,3,3-pentafluoropropane, 1,1,1,3,3,3-hexafluoropropane and 1,1,1,2,3,3,3-heptafluoropropane.

11. The process of claim 10 wherein the blowing agent comprises 1,1,1,3,3-pentafluorobutane and 1,1,1,2-tetrafluoroethane.

12. The process of claim 10 wherein the blowing agent comprises 1,1,1,3,3-pentafluorobutane and 1,1,1,2,3,3,3-heptafluoropropane.

13. The process of claim 7 wherein water is present in an amount of from 0.05 parts by weight to about 0.5 parts by weight based on 100 parts by weight of components (i)–(iv).

14. The process of claim 7 wherein the polyol is present in an amount of between about 50 parts by weight to about 95 parts by weight based on 100 parts by weight of components (i)–(iv).

15. The process of claim 7 wherein the blowing agent comprises in percent by weight from about 10 to 95 percent of a pentafluorobutane, 5 to 90 percent of a tetrafluoroethane and 1 to 10 percent water with the total percent adding to 100.

16. The process of claim 15 wherein the blowing agent comprises in percent by weight, about 25 to 90 percent of a pentafluorobutane, about 10 to 75 percent of a tetrafluoroethane and 1 to 10 percent water, with the total percent adding to 100.

17. The process of claim 7 wherein the blowing agent comprises in percent by weight from about 10 to 95 percent of a pentafluorobutane, 5 to 90 percent of a heptafluoropropane and 1 to 10 percent water with the total percent adding to 100.

18. The process of claim 17 wherein the blowing agent comprises in percent by weight, about 25 to 90 percent of a pentafluorobutane, about 10 to 75 percent of a heptafluoropropane and 1 to 10 percent water, with the total percent adding to 100.

19. A molded integral skin polyurethane article which is obtained by the process of claim 7.

20. An article of claim 19 wherein the article has a molded density of between about 150 kg/m$^3$ and about 640 kg/m$^3$.

21. The article of claim 20 wherein the article is a shoe sole, steering-wheel, headrest, bicycle saddles, or wood imitation furniture part.

* * * * *